US012512746B2

(12) United States Patent
Bui et al.

(10) Patent No.: US 12,512,746 B2
(45) Date of Patent: Dec. 30, 2025

(54) GATE DRIVE CIRCUIT AND POWER CONVERSION DEVICE

(71) Applicant: HITACHI ASTEMO, LTD., Hitachinaka (JP)

(72) Inventors: Trong Tao Bui, Hitachinaka (JP); Koichi Yahata, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 231 days.

(21) Appl. No.: 18/261,704

(22) PCT Filed: Sep. 30, 2021

(86) PCT No.: PCT/JP2021/036358
§ 371 (c)(1),
(2) Date: Jul. 17, 2023

(87) PCT Pub. No.: WO2022/158052
PCT Pub. Date: Jul. 28, 2022

(65) Prior Publication Data
US 2024/0072635 A1 Feb. 29, 2024

(30) Foreign Application Priority Data
Jan. 19, 2021 (JP) ................. 2021-006738

(51) Int. Cl.
*H02M 1/32* (2007.01)
*H02M 1/00* (2006.01)
*H02M 1/08* (2006.01)

(52) U.S. Cl.
CPC ........... *H02M 1/08* (2013.01); *H02M 1/0009* (2021.05); *H02M 1/32* (2013.01)

(58) Field of Classification Search
CPC ........ H02M 1/08; H02M 1/0009; H02M 1/32; H02M 3/158; H02M 1/007; H02M 7/53871
See application file for complete search history.

(56) References Cited

U.S. PATENT DOCUMENTS 11,029,740 B2 * 6/2021 Kaeriyama .............. G01K 1/08
2014/0085947 A1   3/2014 Capilla et al.
(Continued)

FOREIGN PATENT DOCUMENTS

JP   S59-132385 U   9/1984
JP   2005-033678 A   2/2005
(Continued)

OTHER PUBLICATIONS

Japanese Office Action issued in corresponding JP Application No. 2022-576970, dated Nov. 5, 2024 with Machine translation (8 pages).
(Continued)

*Primary Examiner* — Kyle J Moody
(74) *Attorney, Agent, or Firm* — Foley & Lardner LLP

(57) ABSTRACT

There is provided a gate drive circuit that controls a gate voltage applied to a gate terminal of a switching element and drives the switching element. The gate drive circuit includes an overcurrent detection circuit that detects an overcurrent state based on a value of a current flowing through the switching element. A monitor voltage of a power supply line that is connected to the switching element and supplies power to the switching element is input to the overcurrent detection circuit, and the overcurrent detection circuit detects an overvoltage state when the monitor voltage is equal to or greater than a predetermined threshold value.

6 Claims, 6 Drawing Sheets

(56) References Cited

U.S. PATENT DOCUMENTS

| | | |
|---|---|---|
| 2014/0092655 A1 | 4/2014 | Igarashi et al. |
| 2017/0019030 A1 | 1/2017 | Sugawara |
| 2019/0190512 A1 | 6/2019 | Takuma |
| 2019/0204889 A1 | 7/2019 | Kaeriyama et al. |
| 2020/0204065 A1 | 6/2020 | Masuda et al. |

FOREIGN PATENT DOCUMENTS

| | | |
|---|---|---|
| JP | 2015-019455 A | 1/2015 |
| JP | 2017-28778 A | 2/2017 |
| JP | 2019-110521 A | 7/2019 |
| JP | 2019-122107 A | 7/2019 |
| WO | WO-2012/077187 A1 | 6/2012 |
| WO | WO-2019/187544 A1 | 10/2019 |

OTHER PUBLICATIONS

International Search Report with English Translation and Written Opinion dated Dec. 14, 2021 in corresponding International Patent Application No. PCT/JP2021/036358 (9 pages).

\* cited by examiner

GATE DRIVE CIRCUIT AND POWER CONVERSION DEVICE

TECHNICAL FIELD

The present invention relates to a gate drive circuit and a power conversion device.

BACKGROUND ART

As a power conversion device that drives a switching element to mutually convert DC power and AC power, there is known a power conversion device including a plurality of detection circuits that detect an overcurrent state of the switching element and an overvoltage state applied to the switching element.

For example, PTL 1 is known as a technique for performing overvoltage detection by measuring a voltage of a high-voltage line, and performing an overvoltage protection operation.

CITATION LIST

Patent Literature

PTL 1: WO 2012/077187 A

SUMMARY OF INVENTION

Technical Problem

Since it is not possible to normally operate the overvoltage protection operation when an overvoltage detection unit is abnormal, it is conceivable to make the overvoltage detection unit redundant, but there is a problem that the circuit configuration becomes complicated and the circuit cost increases.

Solution to Problem

According to the present invention, there is provided a gate drive circuit that controls a gate voltage applied to a gate terminal of a switching element and drives the switching element. The gate drive circuit includes an overcurrent detection circuit that detects an overcurrent state based on a value of a current flowing through the switching element. A monitor voltage of a power supply line that is connected to the switching element and supplies power to the switching element is input to the overcurrent detection circuit, and the overcurrent detection circuit detects an overvoltage state when the monitor voltage is equal to or greater than a predetermined threshold value.

Advantageous Effects of Invention

According to the present invention, it is possible to simplify a circuit configuration for detecting an overcurrent state and an overvoltage state, and to suppress an increase in circuit cost.

DESCRIPTION OF EMBODIMENTS

Hereinafter, embodiments of the present invention will be described with reference to the drawings. The following description and drawings are examples for describing the present invention, and are omitted and simplified as appropriate for clarity of description. The present invention can be carried out in various other forms. Unless otherwise specified, each component may be singular or plural.

Figure 1:
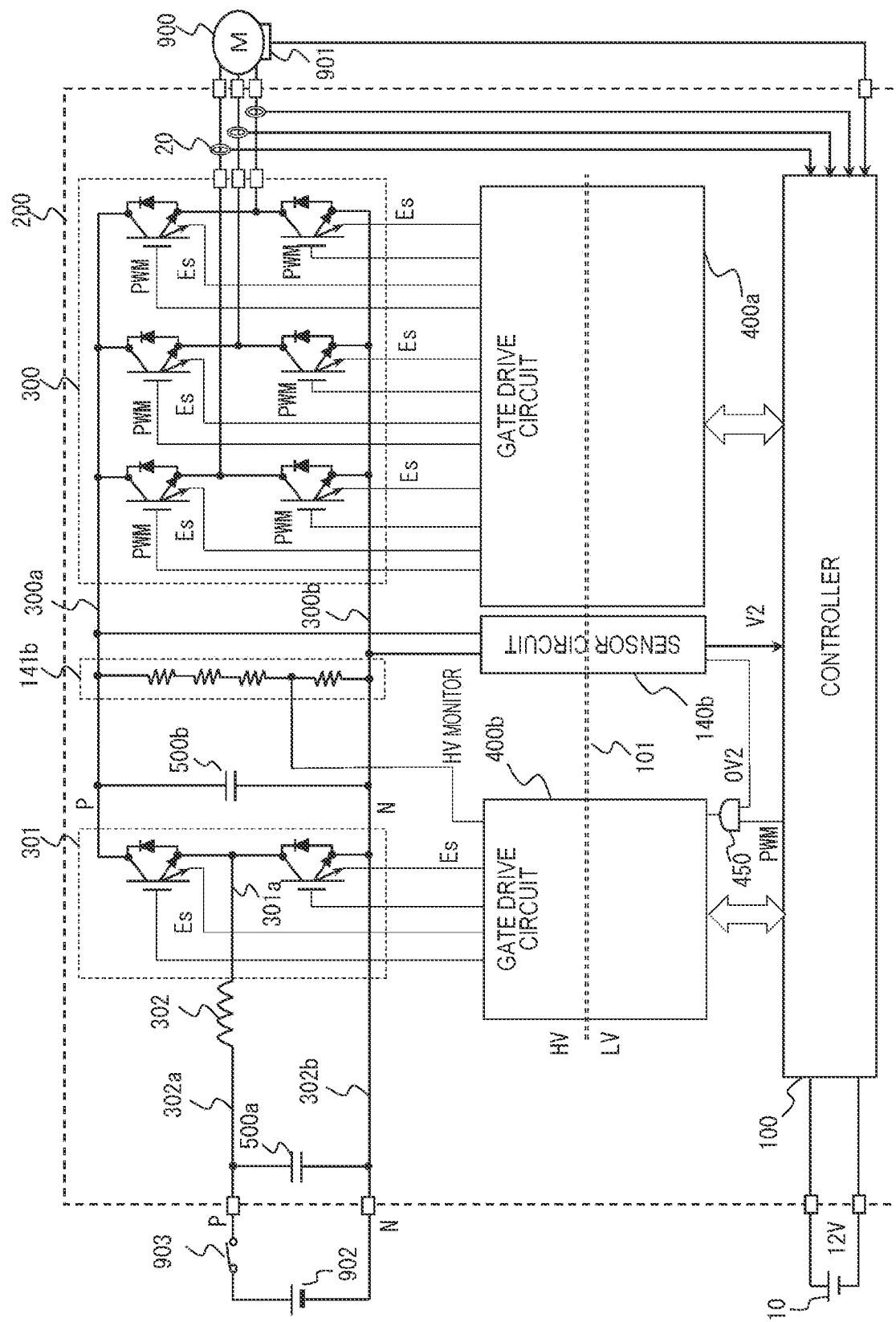
FIG. 1 is an overall configuration diagram of a power conversion device.

FIG. 1 is an overall configuration diagram of a power conversion device 200.

DC power is supplied from a high-voltage battery 902 to the power conversion device 200 via a contactor 903. The power conversion device 200 converts the DC power into AC power and supplies the AC power to a motor 900. In addition, a low-voltage battery 10 supplies an operation voltage to a controller 100 in the power conversion device 200 and to low-voltage sides LV of gate drive circuits 400a and 400b.

The power conversion device 200 includes the controller 100, the gate drive circuits 400a and 400b, a semiconductor device 300 constituting an inverter circuit, a semiconductor device 301 constituting a DC-DC converter, a voltage dividing circuit 141b, and the like. The gate drive circuit 400a drives a switching element in the semiconductor device 300. The gate drive circuit 400b drives a switching element in the semiconductor device 301.

A command for driving the motor, such as a torque command and a rotation command, is input to the controller 100 of the power conversion device 200 from a higher controller (not illustrated), and the controller 100 outputs a PWM signal to the gate drive circuits 400a and 400b in response to the command.

The voltage supplied from the high-voltage battery 902 is supplied from a smoothing capacitor 500a and power supply lines 302a and 302b via a reactor 302 to an intermediate connection point between two switching elements that are connected in series and constitute the semiconductor device 301.

The gate drive circuit 400b performs switching operation on the switching element of the semiconductor device 301 in accordance with the PWM signal, and performs control to boost a DC voltage supplied to the motor 900 in cooperation with the reactor 302. That is, the gate drive circuit 400b drives the switching elements constituting the DC-DC converter.

The voltage output from the semiconductor device 301 is supplied from power supply lines 300a and 300b to the inverter circuit constituting the semiconductor device 300. The inverter circuit includes switching elements constituting three-phase upper and lower arms.

The gate drive circuit 400a drives the switching element of the semiconductor device 300 in accordance with the PWM signal, and controls the torque and the rotation speed of the motor 900. That is, the gate drive circuit 400*a* drives the switching elements constituting the inverter circuit.

Each of the switching elements of the semiconductor devices 300 and 301 has a sense emitter, and a current sense signal Es is output to the gate drive circuits 400*a* and 400*b*.

The gate drive circuits 400*a* and 400*b* and a sensor circuit 140*b* (described later) are separated into a high-voltage side HV and a low-voltage side LV by an insulating element 101.

In addition, a smoothing capacitor 500*b* and the voltage dividing circuit 141*b* are provided in parallel between the positive electrode P and the negative electrode N of the power supply lines 300*a* and 300*b*. The voltage dividing circuit 141*b* is configured by connecting a plurality of resistors in series between the positive electrode P and the negative electrode N of the power supply line 300*a*. The voltage divided by the voltage dividing circuit 141*b* is input to the gate drive circuit 400*b* as an HV monitor voltage for overvoltage detection. When an overvoltage has occurred between the positive electrode P and the negative electrode N of the power supply lines 300*a* and 300*b*, the HV monitor voltage is input to the gate drive circuit 400*b* in order to stop the operation of the switching element constituting the DC-DC converter of the semiconductor device 301.

Further, the voltage between the positive electrode P and the negative electrode N of the power supply lines 300*a* and 300*b* is input to the sensor circuit 140*b*. The sensor circuit 140*b* detects the voltage between the positive electrode P and the negative electrode N, and outputs a voltage detection signal V2 to the controller 100.

Furthermore, the sensor circuit 140*b* detects an overvoltage between the positive electrode P and the negative electrode N, and outputs an overvoltage detection signal OV2 to one terminal of an AND gate 450. A PWM signal is input from the controller 100 to the other terminal of the AND gate 450. As a result, the PWM signal output from the controller 100 to the gate drive circuit 400*b* is interrupted when the overvoltage detection signal OV2 is output.

The motor 900 is provided with a rotational position sensor 901, and a detection value of the rotational position sensor 901 is output to the controller 100. A current sensor 20 is provided between an output terminal of the semiconductor device 300 and an output terminal of the power conversion device 200, and a detection value of the current sensor 20 is output to the controller 100. Thus, the controller 100 controls the voltage, the current, and the rotation speed in accordance with the torque of the motor 900.

Note that, although not illustrated in FIG. 1, components as follows may be provided. A voltage dividing circuit is provided between the positive electrode P and the negative electrode N of the power supply lines 302*a* and 302*b* in parallel with the smoothing capacitor 500*a*, and the voltage divided by the voltage dividing circuit is input to the gate drive circuit 400*b* as an HV monitor voltage for overvoltage detection. When an overvoltage has occurred between the positive electrode P and the negative electrode N of the power supply lines 302*a* and 302*b*, the HV monitor voltage is input to the gate drive circuit 400*b* in order to stop the operation of the switching element constituting the DC-DC converter of the semiconductor device 301. Further, a sensor circuit to which the voltage between the positive electrode P and the negative electrode N of the power supply lines 302*a* and 302*b* is input is provided. The sensor circuit detects the voltage between the positive electrode P and the negative electrode N, and outputs a voltage detection signal to the controller 100.

In addition, in the following example, a case where the present embodiment is applied to the gate drive circuit 400*b* will be described as an example, but the present embodiment may be applied to the gate drive circuit 400*a*. In the case of applying the present embodiment to the gate drive circuit 400*a*, an occurrence of overvoltage is detected, and the gate drive circuit 400*a* stops the operation of the switching elements constituting the inverter circuit of the semiconductor device 300.

Figure 2:
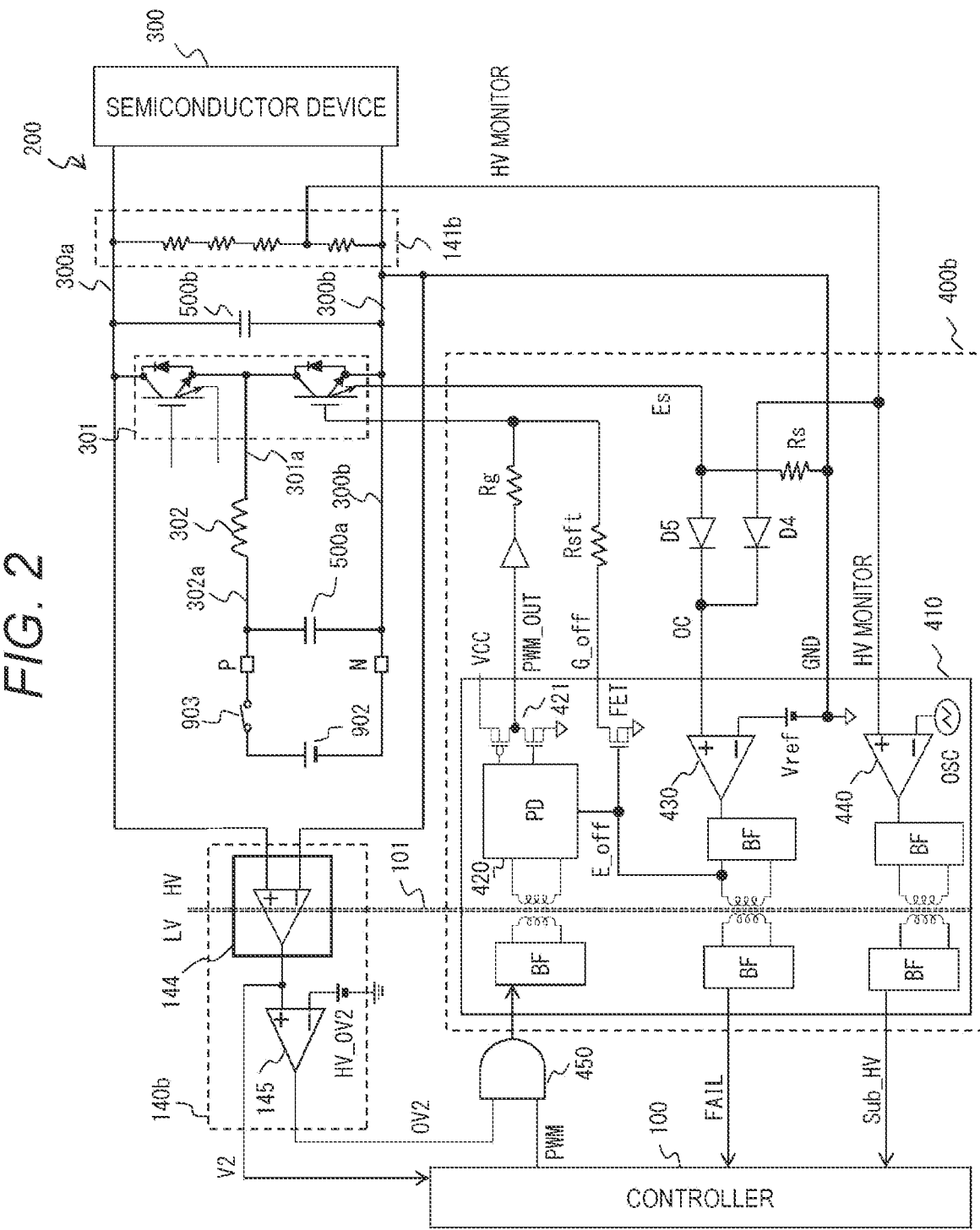
FIG. 2 is a detailed configuration diagram of the power conversion device.

FIG. 2 is a detailed configuration diagram of the power conversion device 200. Regarding the gate drive circuit 400*b*, FIG. 2 illustrates a circuit corresponding to the lower arm, and illustration of a circuit corresponding to the upper arm is omitted, but the circuit corresponding to the upper arm has a similar configuration. In FIG. 2, the same portions as those in FIG. 1 are denoted by the same reference signs, and the description thereof will be omitted.

The sensor circuit 140*b* includes a comparator 144 that detects a voltage between the positive electrode P and the negative electrode N of the power supply lines 300*a* and 300*b*, and the detection voltage V2 is input to the controller 100. The detection voltage V2 is input to one terminal of a comparator 145. A threshold voltage HV_OV2 is input to the other terminal of the comparator 145. Thus, when the detection voltage V2 exceeds the threshold voltage HV_OV2, the comparator 145 outputs an overvoltage detection signal OV2 to one terminal of the AND gate 450, and interrupts the PWM signal output from the controller 100.

The gate drive circuit 400*b* includes a gate drive IC 410. The gate drive IC 410 includes a pre-driver circuit 420, a comparator 430, an amplifier 440, a buffer circuit BF, an insulating element 101, and the like.

In a normal state in which the overvoltage detection signal OV2 is not output, the PWM signal output from the controller 100 is input to the pre-driver circuit 420 via the buffer circuit BF and the insulating element 101. A drive signal PWM_OUT is applied from a driver circuit 421 to the gate terminal of the switching element via a resistor Rg. That is, the gate drive circuit 400*b* controls the gate voltage applied to the gate terminal of the switching element to drive the switching element.

The current sense signal Es is output from the switching element via a resistor Rs. An overcurrent detection voltage applied to a resistor Rs is output to one terminal of the comparator 430 via a diode D5. A threshold voltage Vref is input to the other terminal of the comparators 430. When the overcurrent detection voltage exceeds the threshold voltage Vref, the comparator 430 changes an off signal E_off from Low to High via the buffer circuit BF. When the off signal E_off is High, a FET is brought into a conductive state, whereby a terminal G_off applied to the gate of the switching element via a resistor Rsft is set to Low, and the switching element is set to soft turn-off.

An overcurrent detection circuit is a circuit that detects the current sense signal Es by the resistor Rs, the diode D5, and the comparator 430 and turns off the switching element by the FET and the resistor Rsft. The overcurrent detection circuit detects an overcurrent state based on a value of a current flowing through the switching element to turn off the switching element.

The voltage divided by the voltage dividing circuit 141*b* is connected to a detection line OC on the output side of the diode D5 in the overcurrent detection circuit via a diode D4 as an HV monitor voltage for overvoltage detection. That is, the overcurrent detection circuit detects the voltage value of the detection line OC output after the value of the current is converted into the voltage value, and the output of the voltage dividing circuit 141*b* obtained by dividing the voltage of the power supply line is connected to the detection line OC. The overcurrent detection circuit detects an overcurrent state or an overvoltage state when the voltage value of the detection line OC is equal to or greater than a predetermined threshold value. When the comparator 430 detects an overcurrent state or an overvoltage state, a failure signal FAIL is output to the controller 100 via the buffer circuit BF and the insulating element 101. As described above, in the present embodiment, it is possible to simplify a circuit configuration for detecting an overcurrent state and an overvoltage state, and to suppress an increase in circuit cost. Furthermore, it is possible to simplify a circuit configuration although the overvoltage is also detected in the sensor circuit 140b, and to make the detection circuit redundant while suppressing an increase in circuit cost.

In addition, the voltage divided by the voltage dividing circuit 141b is input to the amplifier 440 as an HV monitor voltage for overvoltage detection, and the voltage is output to the controller 100 as a sub-detection voltage Sub_HV via the buffer circuit BF and the insulating element 101.

The overvoltage state is a state in which the voltage between the positive electrode P and the negative electrode N of the power supply lines 300a and 300b is higher than the rated voltage of the semiconductor device 301, the smoothing capacitor 500b, and the like. The overvoltage state is redundantly detected by both the sensor circuit 140b and the overcurrent detection circuit in the gate drive circuit 400b. At this time, both the sensor circuit 140b and the overcurrent detection circuit may operate normally, or the sensor circuit 140b may operate abnormally.

The detection voltage V2 is input from the sensor circuit 140b to the controller 100, and the sub-detection voltage Sub_HV and the failure signal FAIL are input from the gate drive circuit 400b to the controller 100.

The controller 100 determines that the sensor circuit 140b is abnormal when a difference between the detection voltage V2 and the sub-detection voltage Sub_HV is equal to or greater than a predetermined voltage at a voltage level at which no overvoltage occurs.

Further, the controller 100 determines that the current state is the overcurrent state when both the detection voltage V2 and the sub-detection voltage Sub_HV are equal to or smaller than threshold values and the failure signal FAIL is input.

Furthermore, the controller 100 determines that the voltage state is the overvoltage state when at least one of the detection voltage V2 and the sub-detection voltage Sub_HV exceeds the threshold value and the difference between the detection voltage V2 and the sub-detection voltage Sub_HV is equal to or smaller than the predetermined voltage.

Figure 3:
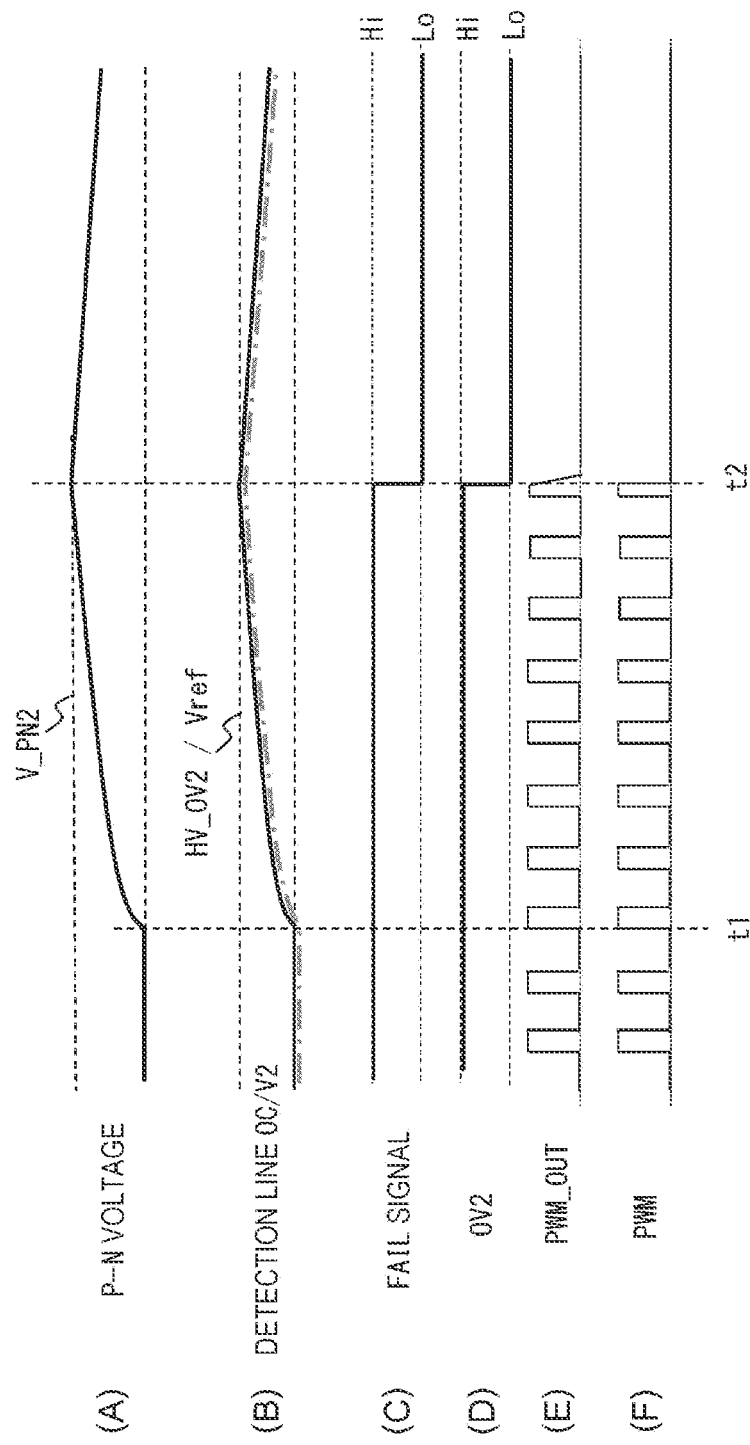
FIGS. 3(A) to 3(F) are timing charts illustrating an overvoltage protection operation when a sensor circuit and an overcurrent detection circuit are normal.

FIG. 3 is timing charts illustrating an overvoltage protection operation when the sensor circuit 140b and the overcurrent detection circuit are normal. FIG. 3(A) illustrates the voltage between the positive electrodes P and the negative electrodes N of the power supply lines 300a and 300b. FIG. 3(B) illustrates the voltage (solid line) of the detection line OC in the overcurrent detection circuit and the detection voltage V2 (alternate long and short dash line) of the sensor circuit 140b. FIG. 3(C) illustrates the failure signal FAIL. FIG. 3(D) illustrates the overvoltage detection signal OV2. FIG. 3(E) illustrates the drive signal PWM_OUT output from the driver circuit 421, and FIG. 3(F) illustrates a drive signal PWM output from the controller 100.

As illustrated in FIG. 3(A), the voltage between the positive electrode P and the negative electrode N of the power supply lines 300a and 300b starts to rise at a time point t1. When the voltage reaches a predetermined voltage V_PN2 at a time point t2, the detection voltage V2 of the sensor circuit 140b exceeds a threshold voltage HV_OV2 as indicated by the alternate long and short dash line in FIG. 3(B). In this case, as illustrated in FIG. 3(D), the sensor circuit 140b outputs the overvoltage detection signal OV2. The overvoltage detection signal OV2 is output to one terminal of the AND gate 450 and interrupts the PWM signal output from the controller 100. Thus, as illustrated in FIG. 3(E), the drive signal PWM_OUT of the gate drive IC 410 becomes Low, and the switching element is turned off. At the same time point t2, as indicated by the solid line in FIG. 3(B), the voltage of the detection line OC connected to the HV monitor voltage of the voltage dividing circuit 141b becomes higher than the threshold voltage Vref, and the overcurrent detection circuit including the comparator 430 and the like performs the overvoltage protection by the same operation as the overcurrent protection of the switching element. The switching element is turned off. Further, as illustrated in FIG. 3(C), the failure signal FAIL is input from the overcurrent detection circuit to the controller 100.

That is, when both the sensor circuit 140b and the overcurrent detection circuit are normal, the overvoltage state is detected by both circuits, and the overvoltage protection operation is performed.

Figure 4:
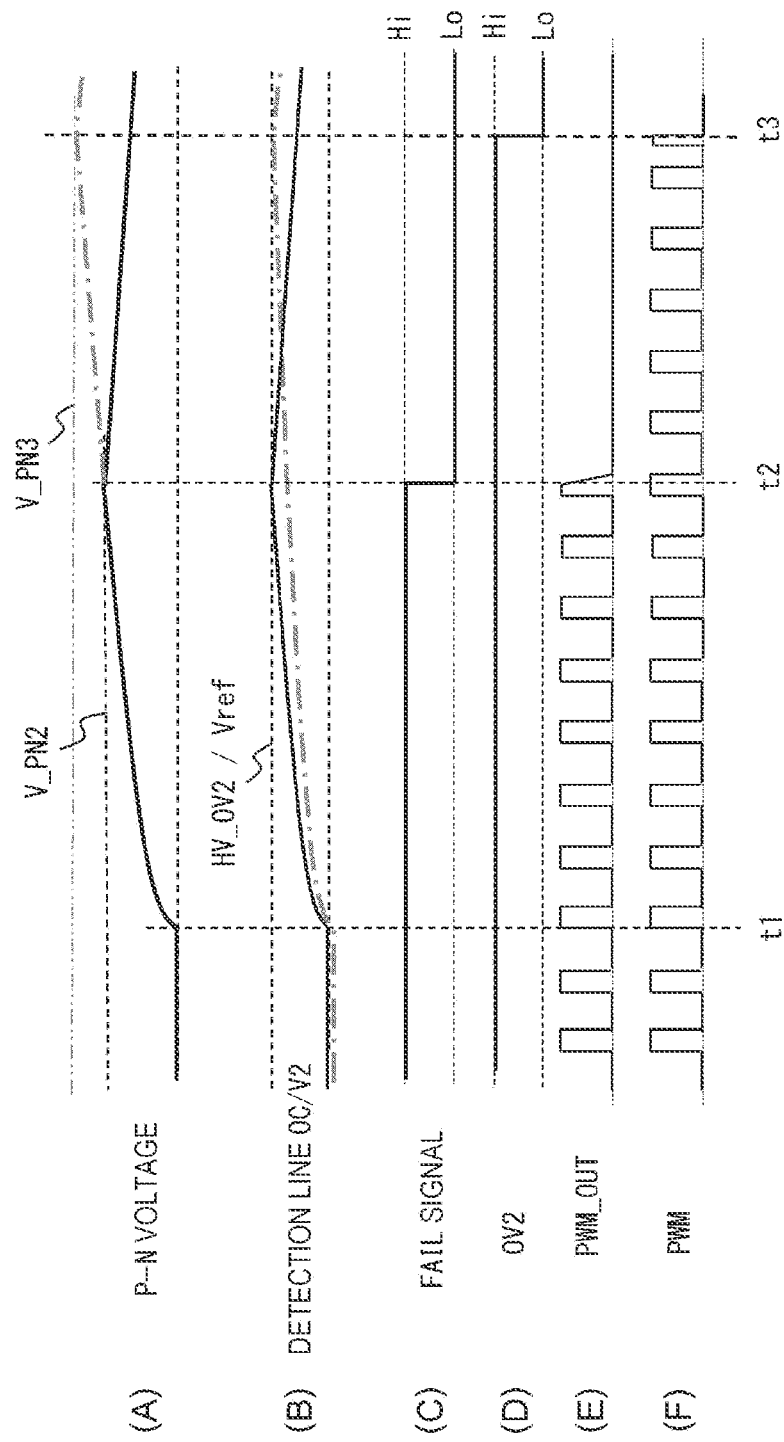
FIGS. 4(A) to 4(F) are timing charts illustrating an overvoltage protection operation when the sensor circuit is abnormal.

FIG. 4 is timing charts illustrating the overvoltage protection operation when the sensor circuit 140b is abnormal, and the detection voltage V2 is output low. FIG. 4(A) illustrates the voltage between the positive electrodes P and the negative electrodes N of the power supply lines 300a and 300b. FIG. 4(B) illustrates the voltage (solid line) of the detection line OC in the overcurrent detection circuit and the detection voltage V2 (alternate long and short dash line) of the sensor circuit 140b. FIG. 4(C) illustrates the failure signal FAIL. FIG. 4(D) illustrates the overvoltage detection signal OV2. FIG. 4(E) illustrates the drive signal PWM_OUT output from the driver circuit 421, and FIG. 4(F) illustrates a drive signal PWM output from the controller 100.

As illustrated in FIG. 4(A), the voltage between the positive electrode P and the negative electrode N of the power supply lines 300a and 300b starts to rise at a time point t1. Even when the voltage reaches the predetermined voltage V_PN2 at the time point t2, the detection voltage V2 of the sensor circuit 140b does not exceed the threshold voltage HV_OV2 as indicated by the alternate long and short dash line in FIG. 4(B) because the sensor circuit 140b is abnormal and the detection voltage V2 is output low. Therefore, even when the voltage between the positive electrode P and the negative electrode N is in an overvoltage state, the voltage continues to rise by the operation of the DC-DC converter in the semiconductor device 301. As illustrated in FIG. 4(D), the voltage rises until reaching a predetermined voltage V_PN3 (V_PN3>V_PN2) at a time point t3, that is, until the detection voltage V2 of the sensor circuit 140b exceeds the threshold voltage HV_OV2 and the overvoltage detection signal OV2 is output. Therefore, the voltage between the positive electrode P and the negative electrode N may exceed the rated voltages of the semiconductor devices 300 and 301, the smoothing capacitor 500b, and the like. However, in the present embodiment, the HV monitor voltage of the voltage dividing circuit 141b is connected to the detection line OC. Thus, as indicated by the solid line in FIG. 4(B), the overvoltage protection is normally performed by the same operation as the overcurrent protection at the time point t2 when the detection line OC exceeds the threshold voltage Vref. As illustrated in FIG. 4(E), the drive signal PWM_OUT of the gate drive IC 410 becomes Low, and the switching element is turned off.

Further, as illustrated in FIG. 4(C), the failure signal FAIL is input from the overcurrent detection circuit to the controller 100.

That is, even when the sensor circuit 140b is abnormal, and the detection voltage V2 is output low, the overvoltage state is detected by the overcurrent detection circuit, and the overvoltage protection operation is performed.

In the present embodiment, the voltage between the positive electrode P and the negative electrode N of the power supply lines 300a and 300b is detected by the sensor circuit 140b and the overcurrent detection circuit, it is possible to simplify the circuit configuration and suppress an increase in the circuit cost as compared with a case where a circuit corresponding to the sensor circuit 140b is further independently provided.

Figure 5:
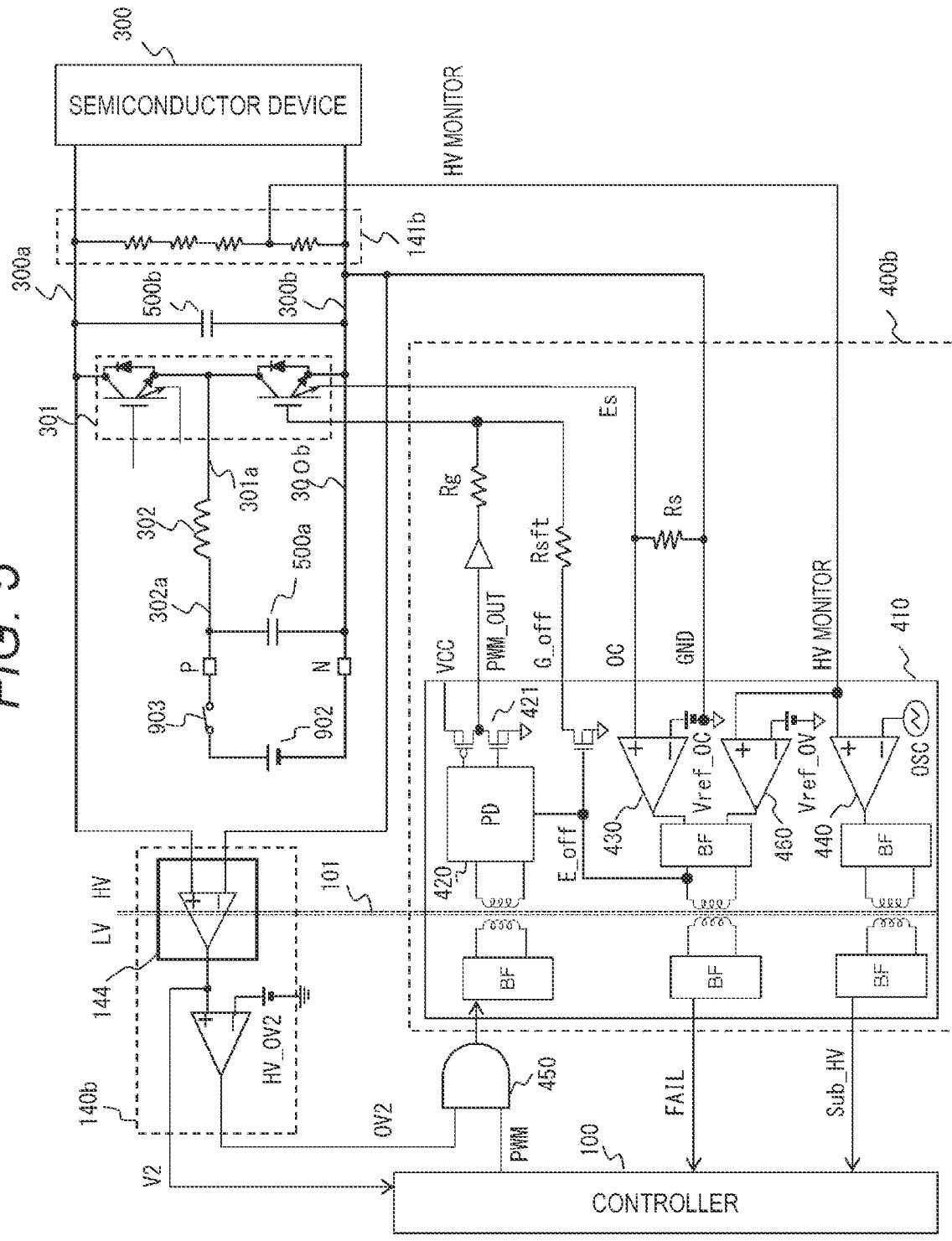
FIG. 5 is a detailed configuration diagram of a power conversion device in a modification example.

FIG. 5 is a detailed configuration diagram of a power conversion device 200 in a modification example. Regarding the gate drive circuit 400b, FIG. 5 illustrates a circuit corresponding to the lower arm, and illustration of a circuit corresponding to the upper arm is omitted, but the circuit corresponding to the upper arm is similar. The same portions as those in FIGS. 1 and 2 are denoted by the same reference signs, and the description thereof will be omitted.

In the power conversion device 200 illustrated in FIG. 5 in the modification example, points different from the power conversion device 200 illustrated in FIG. 2 will be described below.

The gate drive IC 410 has a configuration incorporating a comparator 460 that detects a threshold voltage Vref_OV and a HV monitor voltage from the voltage between the positive electrode P and the negative electrode N of the power supply lines 300a and 300b. That is, when the HV monitor voltage exceeds the threshold voltage Vref_OV, the comparator 460 changes the off signal E_off from Low to High via the buffer circuit BF. A circuit after the output of the comparator 460 is used in common with the overcurrent detection circuit.

Figure 6:
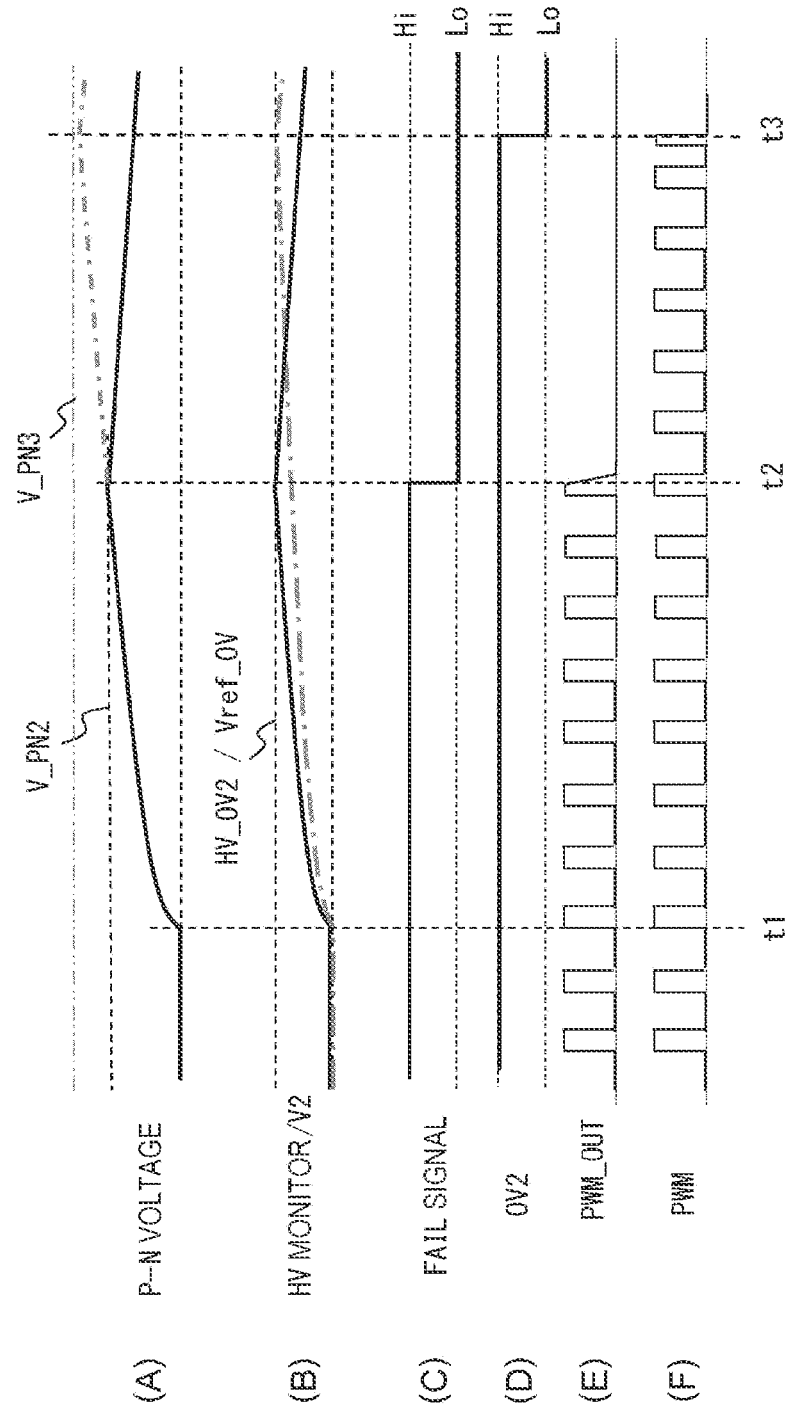
FIGS. 6(A) to 6(F) are timing charts illustrating an overvoltage protection operation when a sensor circuit is abnormal in the power conversion device in the modification example.

FIG. 6 is timing charts illustrating the overvoltage protection operation when the sensor circuit 140b is abnormal and the detection voltage V2 is output low in the power conversion device 200 illustrated in FIG. 5. FIG. 6(A) illustrates the voltage between the positive electrodes P and the negative electrodes N of the power supply lines 300a and 300b. FIG. 6(B) illustrates the HV monitor voltage (solid line) and the detection voltage V2 (alternate long and short dash line) of the sensor circuit 140b. FIG. 6(C) illustrates the failure signal FAIL. FIG. 6(D) illustrates the overvoltage detection signal OV2. FIG. 6(E) illustrates the drive signal PWM_OUT output from the driver circuit 421, and FIG. 6(F) illustrates a drive signal PWM output from the controller 100.

Note that, in the power conversion device 200 illustrated in FIG. 5, the timing charts illustrating the overvoltage protection operation when both the sensor circuit 140b and the overcurrent detection circuit are normal are similar to those in FIG. 3, and thus the description thereof will be omitted.

As illustrated in FIG. 6(A), the voltage between the positive electrode P and the negative electrode N of the power supply lines 300a and 300b starts to rise at a time point t1. Even when the voltage reaches the predetermined voltage V_PN2 at the time point t2, the detection voltage V2 of the sensor circuit 140b does not exceed the threshold voltage HV_OV2 as indicated by the alternate long and short dash line in FIG. 6(B) because the sensor circuit 140b is abnormal and the detection voltage V2 is output low. Therefore, even when the voltage between the positive electrode P and the negative electrode N is in an overvoltage state, the voltage continues to rise by the operation of the DC-DC converter in the semiconductor device 301. As illustrated in FIG. 6(D), the voltage rises until reaching the threshold voltage V_PN3 at the time point t3, that is, until the detection voltage V2 of the sensor circuit 140b exceeds the threshold voltage HV_OV2. Therefore, the voltage between the positive electrode P and the negative electrode N may exceed the rated voltages of the semiconductor devices 300 and 301, the smoothing capacitor 500b, and the like. According to the present embodiment, the HV monitor voltage of the voltage dividing circuit 141b is detected by the comparator 460. Thus, the comparator 460 normally performs the overvoltage protection by the same operation as the overcurrent protection at the time point t2 when the HV monitor voltage exceeds the threshold voltage Vref_OV. As illustrated in FIG. 6(E), the drive signal PWM_OUT of the gate drive IC 410 becomes Low, and the switching element is turned off. Further, as illustrated in FIG. 6(C), the failure signal FAIL is input from the overcurrent detection circuit to the controller 100.

That is, even when the sensor circuit 140b is abnormal, and the detection voltage V2 is output low, the overvoltage state is detected by the overcurrent detection circuit, and the overvoltage protection operation is performed.

Note that, in FIGS. 2 to 6, the gate drive circuit 400b of the switching element constituting the DC-DC converter in FIG. 1 has been described as an example. However, the gate drive circuit 400a of the switching element constituting the inverter circuit basically has a similar configuration, and the similar overvoltage protection operation is performed. That is, the inverter circuit constituted by the switching element, the sensor circuit that detects the voltage of the power supply line, and the controller to which the detection results of the sensor circuit and the overcurrent detection circuit are input are provided, and the controller determines abnormality of the sensor circuit based on the detection results of the sensor circuit and the overcurrent detection circuit.

In the present embodiment, the voltage between the positive electrode P and the negative electrode N of the power supply lines 300a and 300b is detected by the sensor circuit 140b and the overcurrent detection circuit, it is possible to simplify the circuit configuration and suppress an increase in the circuit cost as compared with a case where a circuit corresponding to the sensor circuit 140b is further independently provided.

According to the embodiment described above, the following operational effects can be obtained.

(1) The gate drive circuits 400a and 400b control the gate voltage applied to the gate terminal of the switching element to drive the switching element. The gate drive circuits 400a and 400b include the overcurrent detection circuit that detects the overcurrent state based on the value of the current flowing through the switching element. The monitor voltages of the power supply lines 300a and 300b that are connected to the switching elements and supply power to the switching elements are input to the overcurrent detection circuit, and the overcurrent detection circuit detects the overvoltage state when the monitor voltage is equal to or greater than the predetermined threshold value. As a result, it is possible to simplify a circuit configuration for detecting an overcurrent state and an overvoltage state, and to suppress an increase in circuit cost.

The present invention is not limited to the above-described embodiment, and other forms conceivable within the scope of the technical idea of the present invention are also included in the scope of the present invention as long as the characteristics of the present invention are not impaired.

REFERENCE SIGNS LIST 10 low-voltage battery
100 controller
101 insulating element
140b sensor circuit
141b voltage dividing circuit
144, 145, 430, 460 comparator
200 power conversion device
300a, 300b power supply line
300, 301 semiconductor device
302 reactor
400a, 400b gate drive circuit
410 gate drive IC
420 pre-driver circuit
440 amplifier
450 AND gate
500a, 500b smoothing capacitor
900 motor
902 high-voltage battery
903 contactor
BF buffer circuit
Rg, Rsft resistor
D4, D5 diode
OC detection line
Vref, Vref_OC, Vref_OV threshold voltage
Sub_HV sub-detection voltage
PWM, PWM_OUT drive signal
E_off off signal
Es current sense signal
V2 voltage detection signal
OV2 overvoltage detection signal
FAIL failure signal

The invention claimed is:

1. A gate drive circuit that controls a gate voltage applied to a gate terminal of a switching element and drives the switching element, the gate drive circuit comprising:
an overcurrent detection circuit that monitors a detection line that receives a derived voltage generated based on a value of a current flowing through the switching element, and
a voltage divider circuit that detects a monitor voltage of a power supply line that is connected to the switching element and supplies power to the switching element is input to the overcurrent detection circuit based on dividing a voltage of a positive electrode and negative electrode of the power supply line by a plurality of resistors and outputs the monitor voltage to the detection line,
wherein the overcurrent detection circuit detects an abnormality when a detection line voltage of the detection line is equal to or greater than a predetermined threshold value.

2. The gate drive circuit according to claim 1, wherein the overcurrent detection circuit stops driving of the switching element when the abnormality is detected.

3. The gate drive circuit according to claim 2,
wherein the overcurrent detection circuit detects the abnormality and stops driving of the switching element, when the voltage value of the detection line is equal to or greater than the predetermined threshold value.

4. The gate drive circuit according to claim 2,
wherein the overcurrent detection circuit includes a first comparator that compares whether a voltage value of a detection line output after the value of the current is converted into a voltage value is equal to or greater than a first threshold value, and a second comparator that compares whether a voltage value of the monitor voltage is equal to or greater than a second threshold value, and
wherein driving of the switching element is stopped upon detection of the first comparator or the second comparator.

5. A power conversion device comprising:
the gate drive circuit according to claim 1;
a DC-DC converter configured by the switching element;
a sensor circuit that detects a direct voltage between the positive electrode and the negative electrode of the power supply line; and
a controller to which detection results of the sensor circuit and the overcurrent detection circuit are input,
wherein the controller determines the sensor circuit to be abnormal based on the detection results of the sensor circuit and the overcurrent detection circuit.

6. A power conversion device comprising:
the gate drive circuit according to claim 1;
an inverter circuit configured by the switching element;
a sensor circuit that detects a direct voltage of between the positive electrode and the negative electrode of the power supply line; and
a controller to which detection results of the sensor circuit and the overcurrent detection circuit are input,
wherein the controller determines the sensor circuit to be abnormal based on the detection results of the sensor circuit and the overcurrent detection circuit.

* * * * *